United States Patent [19]

Perry

[11] 4,317,218
[45] Feb. 23, 1982

[54] ARRANGEMENT FOR REMOTE CONTROL OF REPEATER STATIONS

[75] Inventor: Fred G. Perry, Lynchburg, Va.

[73] Assignee: General Electric Company, Lynchburg, Va.

[21] Appl. No.: 134,331

[22] Filed: Mar. 26, 1980

[51] Int. Cl.³ .............................................. H04B 7/00
[52] U.S. Cl. ...................... 455/54; 455/53; 455/57; 455/133; 455/134; 455/135
[58] Field of Search .............. 455/49, 53, 54, 56, 455/57, 134, 7–11, 135, 136; 179/170 A; 340/147; 371/8, 68

[56]  References Cited
U.S. PATENT DOCUMENTS

| | | | |
|---|---|---|---|
| 2,734,131 | 2/1956 | Magnuski | 455/54 |
| 2,864,943 | 12/1958 | Schultz | 455/53 |
| 3,729,681 | 4/1973 | Elder | 455/135 |
| 3,729,682 | 4/1973 | Elder | 455/135 |
| 3,745,462 | 7/1973 | Trimble | 455/11 |
| 3,916,316 | 10/1975 | Hearn et al. | 455/134 |
| 4,035,729 | 7/1977 | Perry | 455/135 |
| 4,057,761 | 11/1977 | Harbert | 455/135 |
| 4,131,849 | 12/1978 | Freeburg | 455/54 |

Primary Examiner—Benedict V. Safourek
Assistant Examiner—Stephen Chin
Attorney, Agent, or Firm—Cushman, Darby & Cushman

[57] ABSTRACT

A control arrangement for a radio communication system in which mobile users communicate with one another and with a central dispatcher via repeaters. In a first embodiment, the repeater station providing the best quality received signal from a mobile station is caused to re-transmit that signal without the signal traversing lengthy telephone lines to and from a central station. A second embodiment, a repeater station having a local and plural satellite receivers selects the best quality signal among those received by its local receiver and its satellites for re-transmission.

32 Claims, 4 Drawing Figures

ARRANGEMENT FOR REMOTE CONTROL OF REPEATER STATIONS

BACKGROUND OF THE INVENTION

This invention relates in general to mobile radio communications systems utilizing repeaters. More specifically, this invention relates to mobile communications systems wherein mobile stations communicate with one another and with a central dispatcher through a plurality of repeater stations.

When radio communication coverage over large geographic regions or over rough topography is required, it is frequently necessary to utilize a plurality of remote radio repeater stations, each including a receiver and some of which include a transmitter. One such system is illustrated by U.S. Pat. No. 2,734,131, granted Feb. 7, 1956, incorporated herein by reference. That patent discloses a communication system with carrier strength control. A mobile user is able to communicate with a central station through any one of a plurality of repeater stations. A relay arrangement forces two-way communication between the dispatcher and mobile user to be established through the repeater station receiving the strongest signal from the mobile user.

In multiple remote repeater station communications systems, the transmitters within the remote repeater stations may re-transmit received signals or they may transmit dispatcher-originated signals intended for reception by one or more mobile users. Various arrangements are now utilized for enabling and disabling the repeat function and for controlling the various modes of operation of these remote repeater stations (also known as satellite stations) in response to signals received thereby.

Radio signals generated by a mobile station may be received by several repeater stations simultaneously, but one repeater station may receive a mobile-originated signal with a greater signal strength and clarity than another repeater station. Therefore, control arrangements for repeater systems generally include a voter for selecting the strongest received signal detected by a repeater station for coupling via a telephone line to the dispatcher's central station. Thus, the dispatcher is provided the best opportunity to receive and understand a message originated by a mobile user. Presently utilized control systems generally include a central control console such as the MASTR Controller Series 539 and 549 provided by the General Electric Company (MASTR is a registered trademark of the General Electric Company). Details of the General Electric MSTR Controller Series 539 and 549 are set forth in maintenance manual LBI 4478K, data file folder DF 4094, available from the General Electric Company, Mobile Communications Business Division, Lynchburg, Va. The contents of that manual are incorporated herein by reference. A typical control arrangement is shown in FIG. 1.

Referring now to FIG. 1, there is shown a typical known arrangement for controlling two remote repeater stations 10 (10-1 and 10-2). Each of remote repeater stations 10 include a transmitter 12 (12-1 and 12-2, respectively) and a receiver 14 (14-1 and 14-2, respectively). Each repeater 10 has an antenna 16 (16-1 and 16-2, respectively) serving both transmitter 12 and receiver 14. Receiver 14 of each repeater stations 10 is capable of detecting signals originated by a mobile station and providing the detected signals at an output 17 (17-1 and 17-2, respectively) thereof. Mobile communications systems of this type are generally used by field service organizations, police and fire organizations, taxicab organizations, and the like. Therefore the signals are general speech, i.e., audio that is amplitude or angle modulating an RF carrier. However, such systems could be utilized for other forms of communication, such as coded digital data streams, and the like. Therefore, it is to be understood that, as used throughout, the term "signal" is intended to be read in its broadest sense. Signals originated by a mobile station are detected via antennae 16 and receivers 14 and a demodulated audio signal is provided at output 17 of the receivers.

The audio signal from each of receivers 14 is coupled to a voter 18 via a separate and distinct telephone line 20 (20-1 and 20-2, respectively). Voter 18, common to all remote repeater stations 10 is located at some central location serving all remote repeater stations 10. This central location may be in the same general area as central control console 22.

Voter 18 compares the received information signals from each of the remote repeater stations 10 and selects the strongest audio signal from among all of those received. Usually, this is the signal having the best signal-to-noise ratio. Voter 18 is well known and typical examples thereof are shown in U.S. Pat. Nos. 3,729,781; 3,729,682; and 4,035,729. The subject matter of these three U.S. Patents is hereby incorporated as reference. A voter 18 that is in widespread use is the Voting Selector Panel LBI 30002B provided by the General Electric Company. Details thereof are set forth in its maintenance manual data file folder-DF 9025, available from the General Electric Company, Mobile Communications Business Division, Lynchburg, Va. The material contained therein is hereby incorporated by reference. A telephone line 23 couples the selected audio from voter 18 to central control console 22 where it is played through a speaker (not shown) so that the dispatcher can hear the voted signals detected by one of receivers 14. Indicator lights (not shown) indicate to the dispatcher which of receivers 14 is providing the strongest signal.

Console 22 is coupled via telephone lines 24 (24-1 and 24-2, respectively) to each of remote repeater stations 10. Lines 24-1 couples central control console 22 to remote repeater station 10-1 and line 24-2 couples central control console 22 to remote repeater station 10-2. The dispatcher can originate audio signals and couple them via lines 24 to either of remote repeater stations 10. This allows the dispatcher to engage in two-way communication with a mobile user via a dispatcher-selected remote repeater station 10.

Central control console 22 includes means for generating signals for controlling the various operating modes and functions of remote repeater station 10. Usually, these control signals are in the form of a sequence of tones. In the case of the MASTR R controller provided by the General Electric Company, a first high amplitude tone burst of 2175 Hz is used to secure access to a remote repeater station 10. A second lower amplitude tone burst, known as "function tone" turns on the remote repeater station 10 selected. A third tone or even lower amplitude than the function tone, maintains the remote repeater station 10 in a transmit mode while it is present. This transmit hold tone generally is 20 Db in amplitude less than the amplitude of the function tone. The transmit hold tone is present as long as the dispatcher's push-to-talk switch is depressed.

A control 26 (26-1 and 26-2, respectively for repeater station 10-1 and 10-2) interprets the tones generated at central control console 22 and coupled to the remote repeater station via line 24. After interpreting the tones, control 26 actuates, as appropriate, a relay 28 (28-1 and 28-2, respectively, for stations 10-1 and 10-2) through a relay control 30 (30-1 and 30-2, respectively, for stations 10-1 and 10-2). Control 26 also provides for receiver muting, and other mode controls as needed. Relay 28 couples the input of transmitter 12 to either the output of its associated receiver 14 or to audio line 24 from central control console 22. The control of switch 28 is responsive to the tone sequence from central control console 22 as interpreted by control 26.

The arrangement set forth in FIG. 1 assumes the use of standard remote repeater stations like those normally supplied in systems wherein each remote repeater station includes a transmitter and receiver. Remote repeater stations 10 must be equipped for decoding the signals generated by central control console 22 for enabling and disabling its repeat function.

If the dispatcher wants a transmitter 12 to repeat (re-transmit) the signal received by a receiver 14, he generates the appropriate sequence of tones which, when decoded, sets a memory element (typically, a flip-flop) in the remote repeater station. When set, this memory element enables circuitry within remote repeater station 10 which causes transmitter 12 to re-transmit signals received from its co-located receiver 14. In other words, control 26 is activated to couple the output of receiver 14 to the input of transmitter 12. To disable the repeat function, the dispatcher must issue a second tone sequence which resets the memory element and cancels the re-transmit mode of operation.

In order to properly operate the system shown in FIG. 1, the dispatcher observes indicator lights (not shown) on console 22 indicating which receiver 14 has been selected by voter 18 and manually enables the repeat function of the remote repeater station 10 associated with the selected receiver. Thus, there is an operational disadvantage in utilizing this arrangement. The dispatcher at central control console 22 must manually select the particular remote repeater station 10 that is to re-transmit a particular received transmission. It is necessary for a mobile user to contact the dispatcher and request repeater activation before he is able to communicate with another mobile user. The dispatcher must be careful to avoid simultaneously enabling more than one remote repeater station 10 at a time to prevent simultaneous transmission interference in areas of overlapping coverage. For an active system, the attention required to keep up with communications traffic can be quite burdensome to the dispatcher. In addition, the type of system set forth in FIG. 1 requires that a transmitter be co-located with each receiver. A transmitter can only re-transmit audio detected by its co-located receiver and not from any other receiver.

Generally, the type of system set forth in FIG. 1 does not allow a sufficient level of control from central control console 22. Since non-transmit functions do not have the positive control provided by the hold tone that is used in a transmit function tone sequence, the system is subject to falsing by a momentary power interruption which causes the memory element to change state. If a phone like 24 fails while the repeat function is enabled, the dispatcher has no way to turn off a remote repeater station 10 and has lost control of the system. A second known control arrangement for a plurality of remote stations is shown in FIG. 2.

Referring now to FIG. 2, there is shown an alternate control arrangement presently in use for a plurality of remote stations 30. Four remote stations 30-1, . . . 30-4 are shown. Stations 30-1 and 30-4 include only receivers 32 (32-1 and 32-4, respectively). However, remote stations 30-2 and 30-3 include both receivers 32 (32-2 and 32-3, respectively) and transmitters 34 (34-2 and 34-3, respectively). The output of each receiver 32 is coupled via a separate telephone line 36 (36-1, 36-2, 36-3 and 36-4, respectively) to a voter 38. As with voter 18 shown in FIG. 1, the strongest received signal is selected. This is usually the least noisy signal. The strongest received signal from voter 38 is coupled via telephone lines 40 and 42 to a central control console 44 and to a remote keying unit (RKU) 46, respectively. RKU 46 is suitably an LBI-4650 provided by the General Electric Company and fully described in its maintenance manual data file folder-DF 9025, the contents of which are incorporated herein by reference. Voter 38, in addition to selecting the strongest received information signal and coupling it to console 44 also generates a signal on one of a plurality of lines 39 coupled to a voter select input 50 of a transmitter selection unit (TSU) 52. Each of lines 39 correspond to one of receivers 32. A signal on a particular one of lines 39 therefore identifies the receiver providing the audio signal selected by voter 38. Voter 38 also provides a signal on a line 41 whenever it provides a signal on any of lines 30. In essence, the signal on line 41 is an "OR" function of the signals on lines 39.

RKU 46 includes a control tone generator 56 and a summer 58. Control tone generator 56 has an input coupled to a control input 48 of RKU 46 and an output coupled to one input of summer 58. A second input of summer 58 is coupled to line 42 for receiving the voted audio signal. Summer 58 adds the tones generated by control tone generator 56 to the voted audio signal on lines 40 and 42 and provides a composite signal on a line 54.

Control input 48 of RKU 46 is coupled to line 41 from voter 38. Thus, whenever voter 38 signals TSU 52 via one of lines 39, it provides a signal to control tone generator 56. Control tone generator 56 generates a sequence of tones similar to those that can be generated by central control console 44, which is similar in all relevant respects to central control console 22 described with reference to FIG. 1.

RKU 46 is therefore responsive to both the voter signal at its control input 48 and to the strongest received audio signal coupled thereto via line 42. The signal on output line 54 is a composite of both the strongest received audio signal and a tone sequence for controlling a remote station 30.

Central control console 44 includes means for generating a dispatcher originated tone sequence identical to that produced by control tone generator 56 within RKU 46, on a line 60 coupling it to a signal input of TSU 52. Line 54 from RKU 46 is coupled into line 60 so that the RKU signal will also be coupled to signal input 62 of TSU 52. Thus, TSU 52 can receive signals from either or both of RKU 46 and central control console 44. TSU 52 is suitably an LBI 4615 provided by the General Electric Company and described in its maintenance manual data file folder DF 9025, the contents of which are incorporated herein by reference. TSU 52 includes a relay switch 53 having a pole 55 coupled to its signal input 62. TSU 52 further includes a control 57 for actuating relay switch 53 so as to determine which of its throws will be coupled to pole 55. Control 57 is coupled to lines 39 from voter 38. The particular one of lines 39 having a signal thereon uniquely determines through the action of control 57 which throw of relay switch 52 will be coupled to pole 55. Each throw of relay switch 53 is coupled to a distinct line 64 (64-2 and 64-3, respectively coupled to remote stations 30-2 and 30-3). Thus, a signal on one of lines 39 determines to which of remote stations 30 signal input 62 of TSU 52 is coupled. An audio signal with control tones superimposed thereon appearing at signal input 62 is coupled to the appropriate remote station 30 for transmission. This audio signal can be either a received audio signal selected by voter 38 or a dispatcher-originated audio signal. A voted audio signal from a receiver 32 will have tones from control tone generater 56 superimposed thereon and dispatcher-originated audio will have control tones generated by central control console 44 superimposed thereon. Each remote station 30 having a transmitter 34 includes a control 66 for coupling a line 64 from TSU 52 to the input of its associated transmitter 34.

In this arrangement, the best quality audio signal selected by voter 38 is coupled to central control console 44 so that the dispatcher is able to hear a mobile user. For mobile-to-mobile communication, RKU 46 superimposes a transmit control tone sequence on the selected audio (strongest received information signal) and couples the combined signal to the TSU 52. RKU 46 generates a sequence of tones identical to that generated by console 44 when the dispatcher activates a push-to-talk key for activating a remote transmitter. TSU 52 uses the voted signal to route the strongest received information signal from voter 38 to the transmitter associated with the receiver selected thereby. The remote station 30 selected in accordance with the voted audio signal transmits the audio coupled to it via line 64. Thus, a remote station 30 associated with the receiver providing the strongest received audio signal, as selected by voter 38, re-transmits that audio signal. This arrangement utilizes duplex remote control stations and repeats selected audio with fully automatic transmitter selection. Capability to manually override the automatic selection is normally provided.

Utilizing an arrangement such as set forth in FIG. 2 frees the dispatcher for other duties. The system may be left in an automatic mode and each mobile will have access to repeaters as determined by voter 38. Since each of stations 30 is a remote control station, TSU 52 automatically prevents simulcast situations from developing. Since a transmit tone sequence is utilized for activating transmission by a transmitter 34, a station 30 unkeys when RKU 46 unkeys and a phone line failure of any of lines 40, 42, 54 and 60 cannot leave a remote station 30 in an enabled mode. The positive control provided by a hold tone of the transmit sequence of tone prevents a momentary interruption of power from causing a failure repeater enable situation.

The arrangement shown in FIG. 2 may be utilized when more than one receiver is associated with a single transmitter. This situation frequently is utilized when talk-out coverage is greater than talk-back coverage due to lower power of the mobile radios (such as personal radios). However, there are distinct disadvantages in utilizing the arrangements shown in FIG. 2.

The received information signal to be retransmitted must traverse phone lines from a receiver 32 to voter 38 and then traverse another phone line from TSU 52 to a transmitter 34. This use of tandem phone lines often requires special amplifiers to recover losses and special equalizers for maintaining acceptable frequency response and distortion levels. The extra equipment required for such tandem line use is not normally included in radio equipment and must be separately supplied at additional expense. Noise introduced into the communications links by the phone lines cannot be removed and is enhanced with tandem lines. With normal voice grade lines specified for point-to-point communication the degradation of the repeated signal is likely to be noticeable and may be severe. Higher grades of phone lines can be utilized but this requires additional and recurring expenses making such systems commercially impractical.

SUMMARY OF THE INVENTION

There is therefore provided a control system for a plurality of remote repeater stations which avoids the disadvantages associated with the operations of known control systems.

In a first embodiment, each remote station includes a transmitter and receiver. The audio signal detected by each receiver is coupled to one input of the voter. The strongest voted audio signal is coupled to a central control console operated by a dispatcher. The voter provides an output control signal indicating to a transmitter selection unit which of the receivers has provided the voted audio signal. In addition, the voter provides a control signal to a remote keying unit for generating a tone sequence for keying one of the transmitters. When the voter has selected an audio signal and indicated to the transmitter selection unit which receiver has provided that signal, the tone sequence generated by the remote keying unit is coupled to the remote station associated with the receiver providing the voted audio signal. A control located at the remote repeater station causes the input of its transmitter to be coupled to the output of the receiver providing the voted audio signal. Thus, an audio signal is re-transmitted without being coupled via tandem phone lines to and from the central control console.

In a second embodiment, a plurality of receivers are associated with one remote repeater station including a transmitter. The audio signal detected by each receiver is voted by a first voter. The voted audio signal is coupled to a dispatcher manned central control console and also to a remote keying unit. When the first voter selects an audio signal, it provides a control signal indication to a remote keying unit. The remote keying unit generates a tone sequence for activating a transmitter. This tone sequence is mixed with the voted audio signal and coupled to a transmitter selection unit. The transmitter selection unit couples either dispatcher originated audio or the composite signal from the remote keying unit to one of the remote stations including a transmitter. The appropriate station is selected by a control signal from the first voter. The remote station associated with plural receivers includes a second voter. The two inputs of this second voter are coupled to the output of the receiver located at the remote station and to the transmitter selection unit. The second voter selects the strongest audio signal between that available from the transmitter selection unit and from the co-located receiver. Thus, the best quality audio signal will be re-transmitted by the remote repeater station. In most cases, the degradation of long telephone lines coupling an audio signal from a receiver to a central control console and back again to a transmitter is avoided.

BRIEF DESCRIPTION OF THE DRAWINGS

Many of the attendant advantages of the present invention will be readily apparent as the invention becomes better understood by reference to the following detailed description and the appended claims, when considered in conjunction with the accompanying drawings, wherein:

DETAILED DESCRIPTION OF THE PREFERRED EMBODIMENT

Figure 3:
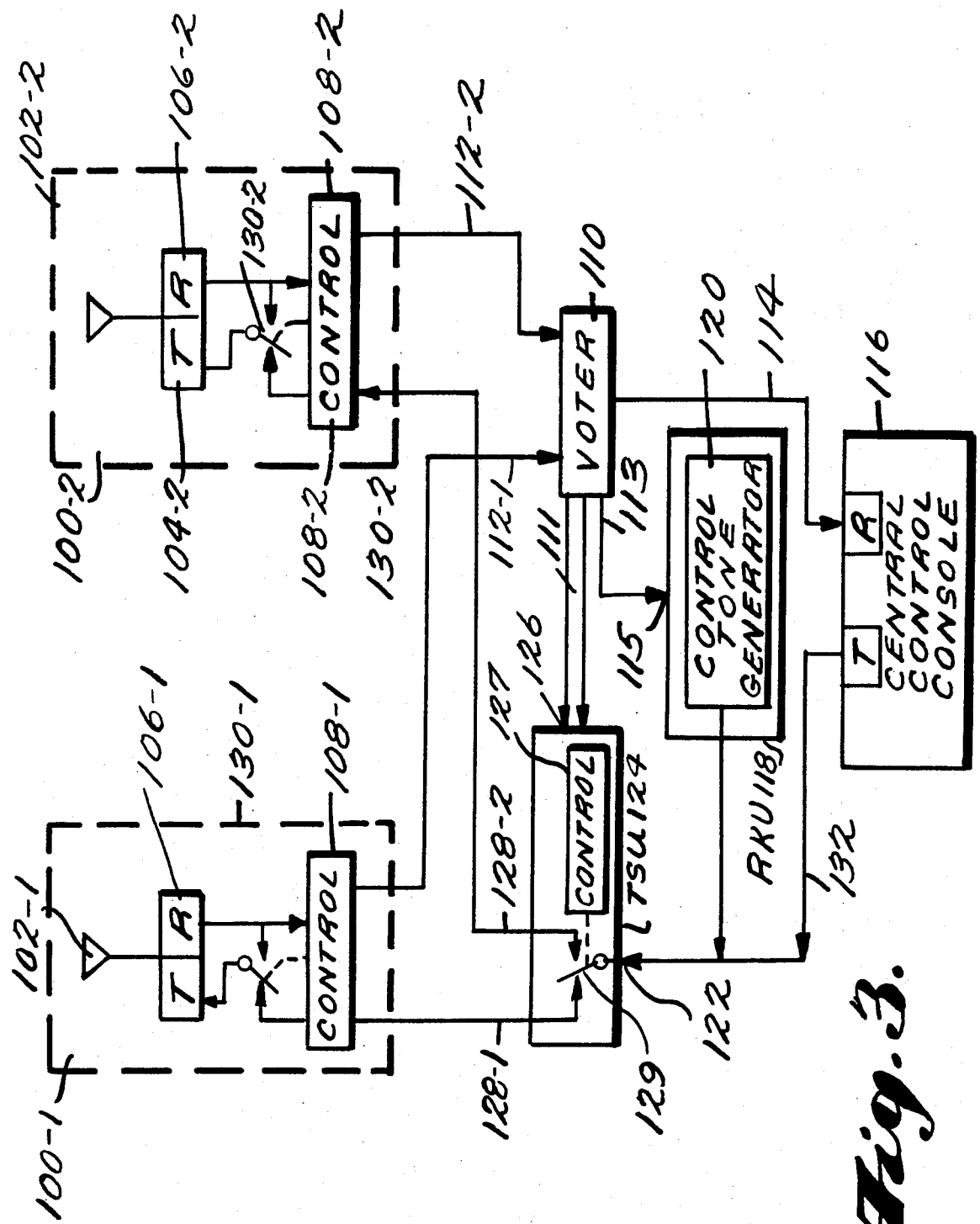
FIG. 3 is a block diagram of a first embodiment of the control arrangement for remote stations according to the present invention.

Referring now to the figures wherein like reference numerals designate like or corresponding parts throughout, and specifically referring to FIG. 3, there is shown a block diagram of one embodiment of the control system arrangement for remote repeater stations according to the present invention. Although the control arrangement is adaptable to any number of remote repeater stations, for illustrative purposes only, the control system is detailed for only two remote repeater stations 100 (100-1 and 100-2). Each remote repeater station 100 includes an antenna 102 (102-1 and 102-2, respectively); a transmitter 104 (104-1 and 104-2, respectively); a receiver 106 (106-1 and 106-2, respectively); and a control 108 (108-1 and 108-2, respectively). The output from each of receivers 106 is coupled through its respective control 130 to a voter 110 by a telephone line 112 (112-1 and 112-2, respectively).

Voter 110 selects the strongest received audio signal and couples it via a line 114, suitably a telephone line, to a central control console 116 so that a dispatcher can hear a mobile user. In addition, voter 110 generates a signal on one of the conductors of a multi-conductor line 111. The particular conductor of line 111 having a signal thereon uniquely identifies the remote station 100 responsible for producing the strongest received audio signal voted by voter 110 and coupled to central control console 116 via line 114. Whenever voter 110 provides a signal on any of the conductors of line 111, it also provides a signal on a line 113 coupled to a control input of a Remote Keying Unit (RKU) 118. A control tone generator 120, within RKU 118, in response to a signal on line 113, generates a sequence of tones for controlling a remote repeater station 100.

The control tones generated by control tone generator 120 are coupled to a signal input 122 of a Transmitter Selection Unit (TSU) 124. TSU 124 includes a control 127 which is coupled to line 111 from voter 110. Control 127 operates a relay switch 129 having a pole coupled to signal input 122 and having multiple throws.

TSU 124, in response to a signal on lines 111 causes a signal coupled to its signal input 122 to be coupled through relay switch 129 to one of lines 128 (128-1 or 128-2, respectively coupled to controls 108-1 and 108-2).

Each of controls 108 includes a decoder (not shown) for recognizing the tone sequence generated in RKU 118. The decoder is coupled to and activates a relay 130 (130-1 and 130-2, respectively). Relay 130 causes the input of a transmitter 104 to be coupled either to line 128 or to the output of its associated receiver 106. Thus, a transmitter 104 can transmit audio originated by the dispatcher via line 132, switch 129, line 128, and switch 130; or the transmitter can re-transmit an audio signal provided by its associated receiver if that audio signal is selected by voter 110. When a transmitter 104 is to re-transmit the audio signal provided by its associated receiver 106, the tone sequence generated in RKU 118 keys the transmitter.

Console 116 includes means for providing dispatcher originated audio and control tones (different from the control tones generated by control tone generator 120) on line 132 coupled to signal input 122 of TSU 124. This allows the dispatcher to key a transmitter 104 from central control console 116. Thus, the dispatcher is able to communicate with a mobile user. The operation of TSU 124 prevents the simultaneous activation of more than one remote repeater station 100 because its signal input 122 can only be coupled to one of lines 128 at a time.

The control tones generated by control tone generator 120 within RKU 118 are distinguishable from those generated by console 116. Control 108 must be capable of recognizing the two different tone sequences and responding differently to each. When the dispatcher transmits, a transmitter 104 transmits audio from line 128. However, when RKU 118 keys a repeater 100, transmitter 104 transmits audio from its co-located receiver 106. In order that a control 108 be able to distinguish between dispatcher keying and RKU keying, two different function tone sequences are used.

Figure 1:
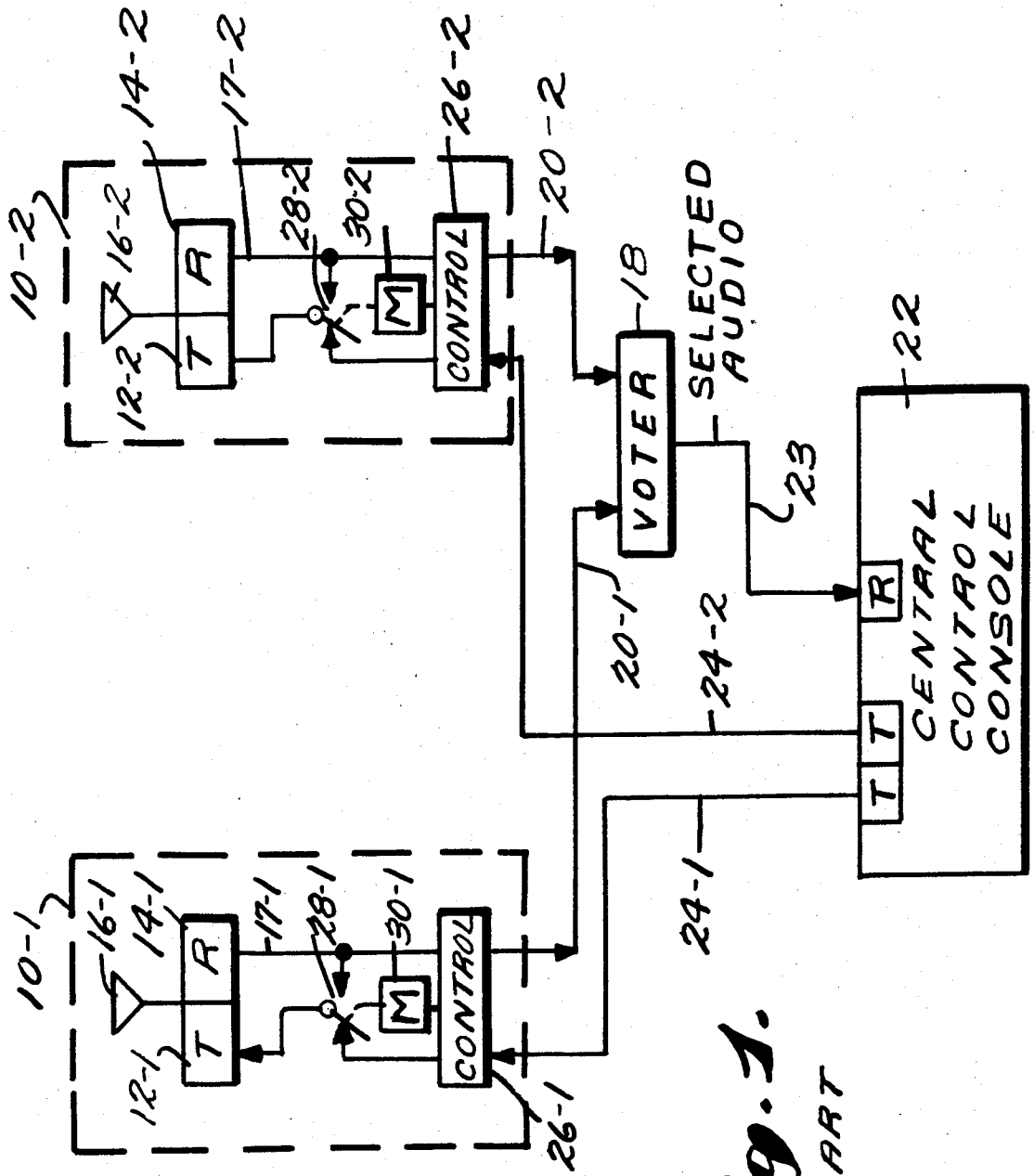
FIG. 1 is a prior art control system for remote repeater stations.
Figure 2:
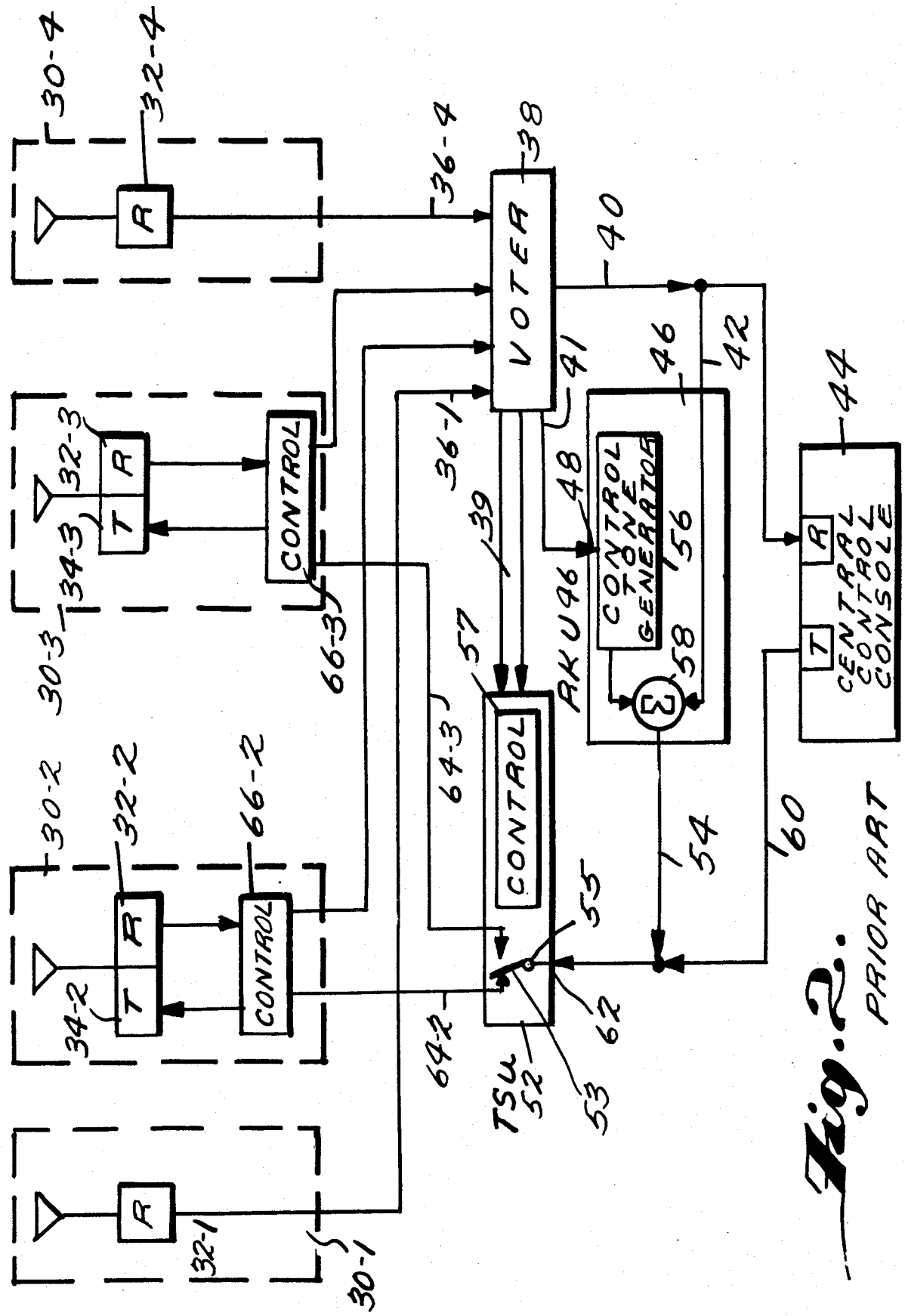
FIG. 2 is a second prior art control system arrangement for remote repeater stations.

The arrangement set forth in block diagram in FIG. 3 incorporates the advantages of the prior art systems shown in FIGS. 1 and 2 while avoiding the disadvantages associated therewith. When voter 110 signals RKU 118 that a transmission is being received, RKU 118 provides a sequence of tones for keying a transmitter 104. At a remote station 100, a decoder in control 108 detects the transmit tone sequence and keys transmitter 104. However, instead of using phone line audio from voter 110, a transmitter 104 retransmits audio from its own receiver 106. Thus, transmitter 104 is keyed via the loop including voter 110, RKU 118, TSU 124 to provide fully automatic selection, but the received signal bypasses the tandem phone lines and no degradation of the communication path occurs. The control signals from receivers 106 to voter 110 and from RKU 118 to a transmitter 104 are each subjected to the degradation of only a single line and are not degraded by tandem lines. Utilizing this arrangement, the control signals can operate with levels of noise and distortion that would be unacceptable in a voice-path communication line.

Utilizing the arrangements set forth in FIG. 3, fully automatic operation is achieved. Control of remote stations 100 via voter 110, RKU 118, and TSU 124 prevents inadvertent simulcast. Phone line failures do not leave a particular remote repeater station 110 stuck in a repeat mode. Furthermore, power interruptions cannot cause false repeater operation. For systems wherein more than one receiver is associated with a single transmitter, a refinement of the arrangement set forth in FIG. 3 is appropriate and is detailed in FIG. 4.

Figure 4:
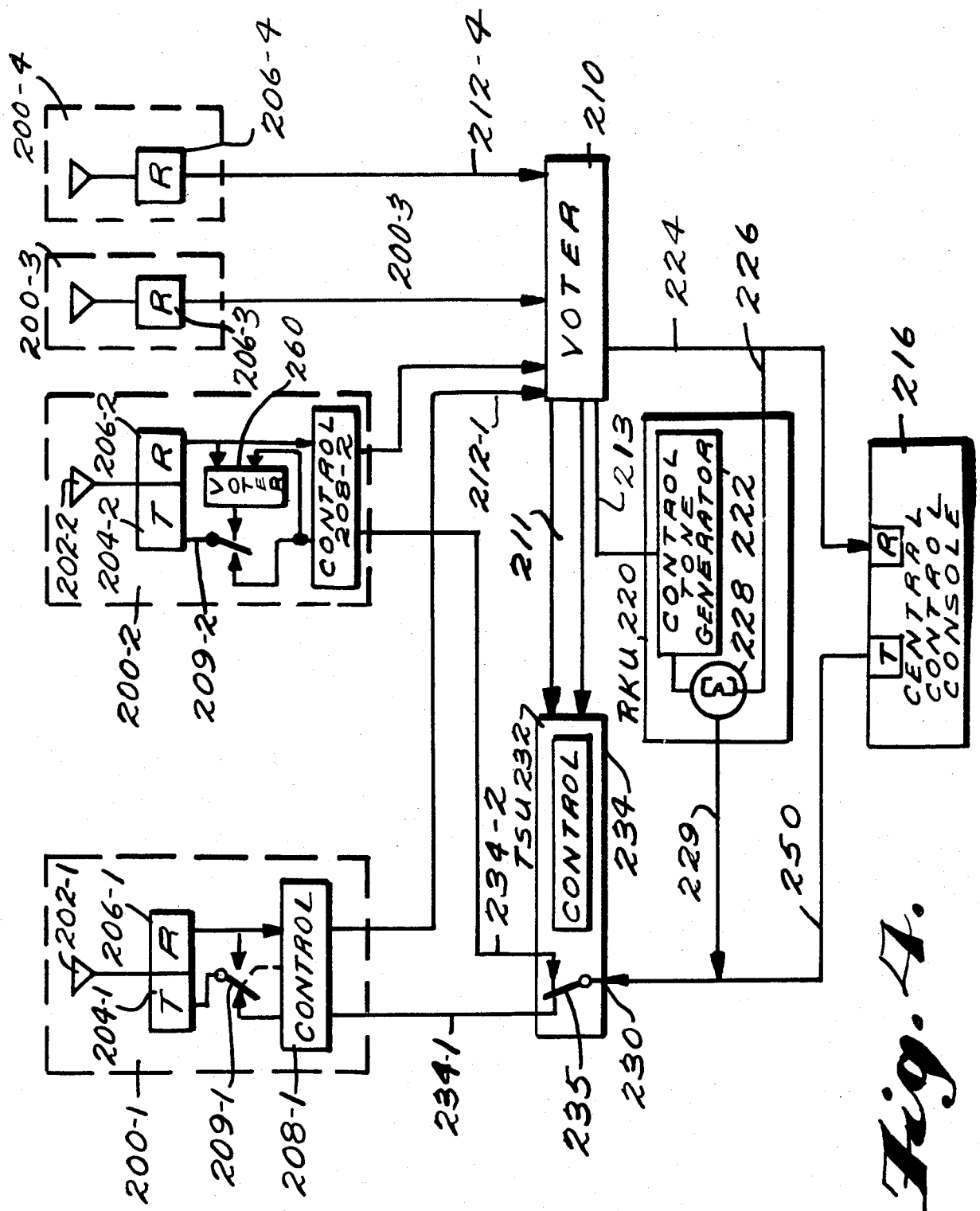
FIG. 4 is an alternate embodiment of the control system arrangement according to the present invention.

Referring now to FIG. 4, there is shown a block diagram of an alternative arrangement for the control of a plurality of remote repeater stations. This particular arrangement is specifically designed for the control of a system of repeater stations wherein more than one receiver is associated with a particular transmitter. For the purposes of illustration only, four remote stations 200 (200-1, 200-2, 200-3, and 204-4) are shown. Each of remote stations 200 include an antenna 202 (202-1, 202-2, 202-3, and 202-4, respectively). Remote stations 200-1 and 200-2 include transmitters 204 (204-1 and 204-2, respectively); and receivers 206 (206-1 and 206-2, respectively). Remote stations 200-3 and 200-4 include receivers 206-3 and 206-4, respectively, but do not include transmitters.

The audio signals detected by receivers 206 are coupled to a voter 210 by lines 212 (212-1, 212-2, 212-3, and 212-4, respectively), one such line associated with each receiver 206.

Voter 210 selects the strongest received audio signal from among those coupled thereto via lines 212. The strongest audio signal, as selected by voter 210 is coupled to a central control console 216 via a line 224. Central control console 216 is manned by a dispatcher. Voter 210 provides a signal on one of a plurality of lines 211, one such line associated with each of transmitters 204. In this arrangement, receivers 206-2, 206-3, and 206-4 are all associated with transmitter 204-2. Hence, a voted audio signal from any of these three receivers would cause a signal from voter 210 to appear on one of the conductors of line 211. Voter 210 provides an additional signal on another line 213 whenever a signal appears on any of the conductors of line 211. Essentially, line 213 is an "OR" function with respect to lines 211.

An RKU 220, similar in all relevant respects to RKU 118 described with reference to FIG. 3, includes a control tone generator 222 and a summer 228. Control tone generator 222 coupled to line 213 generates a tone sequence in response to a signal on line 213. This tone sequence is coupled to one input of summer 228, the other input of which is coupled via a line 226 to line 224 for receiving the voted audio signal. Summer 228 mixes the tone sequence generated by control tone generator 222 with the voted audio signal and provides a composite signal formed thereby on a line 229.

As in the arrangement discussed with reference to FIG. 3, the dispatcher can generate function tones at central control console 216. The function tone sequence generated by the dispatcher is different from the function tone sequence generated by control tone generator 222 within RKU 220. Thus, control 208-1 is able to distinguish between the two tone sequences and switch the input of transmitter 204-1 to either line 234-1 or to the output of receiver 206-1. Dispatcher originated function tones appear on a line 250 from central control console 216 to TSU 232.

TSU 232 includes a control 234 coupled to lines 211 from voter 210 via a TSU control input 236. In response to the signals on line 211 control 234 activates a relay switch 235. Relay switch 235 is a single pole, two-throw switch having its pole coupled to a signal input 230 and each of its throws coupled to a line 234 (234-1 and 234-2, respectively). Line 250 and line 229 coupled into line 250 are coupled to signal input 230. Thus, the signals on lines 250 and 229 can be coupled to either of lines 234-1 or 234-2 in response to a signal on one of the conductors of line 211.

Line 234-1 is coupled to a control 208-1 which activates a switch 209-1. In response to the tone sequence coupled thereto, control 208-1 actuates switch 209-1 to couple the input of transmitter 204-1 to either line 234-1 or to the output of receiver 206-1. Thus, transmitter 204-1 can transmit audio from either of two sources. It can transmit audio that is dispatcher originated via lines 250, relay switch 235, line 234-1, and switch 209-1. It can also transmit audio that is detected by receiver 206-1 and immediately retransmitted via switch 209-1 to the input of transmitter 204-1.

In essence, station 200-1 functions identically to stations 100-1 and 100-2 shown in FIG. 3. However, station 200-2 operates quite differently from either of the remote stations shown in FIG. 3.

Referring now to station 200-2 in FIG. 4, line 234-2 is coupled to a control 208-2 which controls a switch 209. Switch 209-2 couples the input of transmitter 204-2 to either line 234-2 or to the output of a voter 260. The inputs of voter 260 are coupled to line 234-2 and to the output of receiver 206-2, respectively, and votes the strongest signal between these two inputs for coupling to switch 209-2.

Thus, transmitter 204-2 is capable of transmitting audio from any of multiple sources. It can transmit dispatcher originated audio via line 250, switch 235, line 234-2 and switch 209-2. When switch 209-2 is actuated to couple the input of transmitter of 204-2 to the output of voter 260, the transmitter will either re-transmit the audio from receiver 206-2 (if it is voted) or it will re-transmit the audio voted by voter 210 from one of the other receivers via line 224, line 226, line 229, switch 235, line 234-2, voter 260, and switch 209-2.

Utilizing the configuration set forth in FIG. 4, if receiver 206-2 is receiving, transmitter 204-2 will probably re-transmit the audio from receiver 206-2 even if voter 210 has selected a receiver which is not located in the station (206-3 or 206-4). The only way to get the audio signal voted by voter 210 to the station 200-2 is via tandem phone lines thus subjecting it to additional degradation. If the quality of the signal received by the receiver 206-2 is only a little worse than that selected by voter 210, it is preferable to re-transmit audio from receiver 206-2 in order to avoid the additional degradation of the tandem phone lines. This will frequently be the case and the system works well under these conditions.

If the signal received by a station receiver 206-2 is significantly worse than that selected by voter 210, it is preferable to retransmit the audio signal via the tandem phone lines. Voter 260, in essence, chooses between the audio from receiver 206-2 and the audio from voter 210. Voter 260 is equipped with a notch filter to remove the hold tone from the audio on line 234-2 in order to ensure proper voting.

The arrangement set forth in FIG. 4 incorporates all of the advantages of the systems described in FIGS. 1–3. In addition, the system in FIG. 4 always repeats the highest quality audio that can be made available at the transmitter site. Transmitter 204-2 uses the tandem phone lines only when they provide a signal quality that is better than that available from receiver 206-2. Automatic operation, positive control, and protection from falsing are maintained.

Therefore, it is apparent that there has been provided a control system for controlling the operation of a plurality of remote repeater stations for mobile communications. The arrangements provide for both automatic and dispatcher control and for providing the retransmission of the highest quality received signal available.

Obviously, other embodiments and modifications of the present invention will readily come to those of ordinary skill in the art having the benefit of the teachings presented in the foregoing description and drawings. For example, FIG. 3 illustrates an arrangement for only two stations and FIG. 4 illustrates an arrangement for only four stations, only one of which includes a voter 260. It is possible to expand either of these arrangements to include more stations. In the FIG. 4 arrangement, more or fewer receivers can be associated with a single transmitter, or more stations including a voter 260 could be used. The phone lines could be replaced with other types of communication channels, such as microwave links, optical fibers, etc. without departing from the central concept. It is, therefore, to be understood that this invention is not to be limited thereto and that said modifications and embodiments are intended to be included within the scope of the appended claims.

What is claimed and desired to be secured by Letters Patent of the United States is:

1. In a radio communication system for providing communication among mobile stations and between a central station and at least one mobile station, said system having multiple repeater stations each having a transmitter and a receiver providing detected signals from said mobile stations, and said system having at least one voter for selecting one of the detected signals in accordance with predetermined criteria and identifying the repeater station providing the selected signal, the improvement comprising:
   remote means for causing the repeater station so identified by said voter to transmit the selected signal without the selected signal being coupled through said voter, thereby minimizing signal degradation; and
   means for alternatively causing the repeater station so identified to transmit a signal originated by the central station.

2. A radio communications system improvement according to claim 1 wherein the detected signals are audio signals.

3. A radio communication system improvement according to either of claims 1 or 2 wherein said means for causing the identified repeater to transmit comprises:
   means for generating a keying signal;
   means, responsive to said means for selecting and identifying, for coupling the keying signal to the identified repeater station; and
   means, responsive to the keying signal, for coupling the detected audio from the receiver associated with the identified repeater to the transmitter in the repeater.

4. In a radio communication system having multiple repeater stations for providing communication among mobile or portable radio stations and between mobile or portable radio stations and a central radio station, wherein each repeater includes a transmitter and a receiver, the improvement comprising:
   means within each repeater receiver for detecting a mobile or portable originated signal;
   means, coupled to each of said means for detecting, for selecting one of the detected signals and identifying the repeater station providing the selected signal; and
   means, coupled to said means for selecting, for causing the identified repeater station to transmit via its transmitter the selected signal without the selected signal being coupled through said means for selecting, thereby minimizing signal degradation.

5. A radio communication system improvement according to claim 4 wherein the detected signal, originated by a mobile or portable station, is an audio signal.

6. A radio communication system improvement according to either of claims 4 or 5 further comprising:
   a central radio station for generating a dispatcher-originated signal; and
   means for coupling the dispatcher-originated signal to a repeater transmitter.

7. A radio communication system improvement according to claim 6 wherein said means for coupling the dispatcher-originated signal includes means for coupling the dispatcher-originated signal to the transmitter in the repeater providing the selected signal.

8. In a radio communication system having a repeater station including a transmitter, a co-located receiver, and at least one additional remote receiver, each of the receivers providing a detected signal originated by a mobile or portable radio station, the improvement comprising:
   first means for comparing all of the detected signals and first selecting one such signal from among them;
   second means for comparing the audio signal from said co-located receiver with said selected signal and second selecting between them; and
   means for causing said transmitter to transmit said second selected signal.

9. A radio communication system improvement according to claim 8 wherein said detected signals are audio signals.

10. A radio communication system improvement according to either of claims 8 or 9 wherein said first means is a voter.

11. A radio communication system improvement according to either of claims 8 or 9 wherein said second means is a voter.

12. A radio communication system improvement according to claim 10 wherein said second means is a voter.

13. A radio repeater arrangement for providing communication among mobile or portable radio stations and between such mobile or portable stations and a central radio station comprising:
   first and second remote repeater stations each repeater station having a receiver for receiving and detecting a signal originated by a mobile or portable station and providing a detected signal, each of said remote repeater stations further including a repeater transmitter for transmitting a dispatcher-originated signal or for re-transmitting a signal detected by its associated receiver;
   a voter, coupled to each receiver, for selecting a particular signal from among all such signals coupled thereto, for providing the selected signal, for generating a selection signal uniquely identifying the remote station associated with the selected signal, and for providing a keying control signal whenever any mobile or portable originated signal is coupled thereto;
   a remote keying unit (RKU) coupled to the keying control signal and for generating in response thereto a repeater control signal for controlling the operating mode of a remote repeater station;

a transmitter selection unit (TSU) responsive to the selection signal from said voter for selectively dispatching a repeater control signal from said RKU to the remote station associated with the receiver providing the selected signal; and control means within each remote station responsive to the RKU originated repeater control signal for coupling the output of its associated receiver to a signal input of its associated transmitter thereby causing the transmitter to retransmit the received audio signal therefrom.

14. A radio repeater arrangement according to claim 13 wherein said detected signal is an audio signal.

15. A radio repeater arrangement according to either of claims 13 or 14 further including:

a console for generating a dispatcher-originated signal and a console originated repeater control signal for controlling the operating mode of a remote repeater station;

means for coupling the dispatcher-originated signal to said TSU whereby a dispatcher-originated signal and console originated repeater control signal can be coupled to a remote repeater station identified by the selection signal from said voter; and wherein said control means within each remote station includes means responsive to the console originated repeater control signal for coupling the input of the transmitter to the dispatcher-originated signal for transmission to a mobile or portable unit.

16. A radio repeater arrangement according to claim 15 wherein the dispatcher-originated signal includes an audio signal.

17. A radio repeater arrangement according to claim 13 wherein the repeater control signals include at least one tone.

18. A radio repeater arrangement according to claim 15 wherein the repeater control signals include at least one tone.

19. A radio repeater arrangement according to claim 13 wherein the repeater control signals include a sequence of tones.

20. A radio repeater arrangement according to claim 15 wherein the repeater control signals include a sequence of tones.

21. A radio repeater arrangement providing communication among mobile or portable radio stations and between such mobile or portable stations and a central station comprising:

first and second repeater stations each having a receiver for receiving and demodulating a signal transmitted by a mobile or portable station, at least one of which repeater stations includes a transmitter for transmitting a radio signal modulated by dispatcher originated audio, or for retransmitting the information of a signal received by a receiver;

a voter, coupled to each receiver for selecting a particular one of said received signals from among all such signals coupled thereto, for generating a selection signal uniquely identifying the repeater station associated with the selected signal, and for providing a keying control signal whenever any detected audio signal is coupled thereto;

a remote keying unit (RKU), coupled to the voter so as to receive the keying control signal and the selected signal, said RKU for generating a composite signal including an RKU originated repeater control signal for controlling the operating mode of said at least one remote repeater station and also including the received signal selected by said voter;

a transmitter selection unit (TSU) responsive to the selection signal from said voter for selectively dispatching the composite signal from said RKU to the remote station associated with the received signal selected by said voter; and control means within each remote station responsive to the RKU originated mode control signal within the composite signal for coupling the received signal, selected by said voter, directly from the receiver associated therewith to a signal input of the transmitter thereby causing the transmitter to transmit the selected signal.

22. A radio repeater arrangement according to claim 21 wherein said at least one repeater station including a transmitter further comprises:

a second voter having signal inputs coupled to both the receiver associated therewith and to said TSU for selecting either of the signals coupled thereto to said transmitter.

23. A radio repeater arrangement according to either of claims 21 or 22 wherein the detected signals coupled to the voter are audio signals.

24. A radio repeater arrangement according to either of claims 21 or 22 wherein the mode control signals include at least one tone.

25. A radio repeater arrangement according to either of claims 21 or 22 wherein the mode control signals include a sequence of tones.

26. A radio repeater arrangement according to claim 21 further including:

a console for generating a dispatcher originated audio signal and a console originated mode control signal for controlling the operating mode of a remote repeater station;

means for coupling the dispatcher-originated audio signal to said TSU whereby a dispatcher-originated audio signal and console originated mode control signal can be coupled to a remote repeater station identified by the selection signal; and wherein said control means within each remote station includes means responsive to the console originated mode control signal for coupling the input of the transmitter to the dispatcher-originated audio signal for transmission to a mobile or portable unit.

27. A radio repeater arrangement according to claim 26 wherein the operating modes of a remote repeater station include a first mode wherein its transmitter is operating and a second mode wherein its receiver is muted so that no detected audio signal is coupled to said voter.

28. A radio repeater arrangement according to either of claims 26 or 27 wherein the mode control signals include at least one tone.

29. A radio repeater arrangement according to either of claims 26 or 27 wherein the mode control signals include a sequence of tones.

30. A radio repeater arrangement according to claim 22 further including:

a console for generating a dispatcher-originated audio signal and a console originated mode control signal for controlling the operating mode of a remote repeater station;

means for coupling the dispatcher-originated audio signal to said TSU whereby a dispatcher-originated audio signal and console originated mode control signal can be coupled to a remote repeater station identified by the selection signal; and wherein said control means within each remote station includes means responsive to the console originated mode control signal for coupling the input of the transmitter to the dispatcher originated audio signal for transmission to a mobile or portable unit.

31. A radio repeater arrangement according to claim 30 wherein the mode control signal includes at least one tone.

32. A radio repeater arrangement according to claim 30 wherein the mode control signals includes a sequence of tones.

* * * * *